US012769406B2

(12) United States Patent
Weill-Duflos et al.

(10) Patent No.: US 12,769,406 B2
(45) Date of Patent: Oct. 20, 2026

(54) INPUT DEVICE FOR 2D POINTING AND 3D FORCE FEEDBACK

(71) Applicant: Haply Robotics Inc., Montreal (CA)

(72) Inventors: Antoine Francois Remi Weill-Duflos, Montreal (CA); Colin Gallacher, Montreal (CA)

( * ) Notice: Subject to any disclaimer, the term of this patent is extended or adjusted under 35 U.S.C. 154(b) by 0 days.

(21) Appl. No.: 19/106,831

(22) PCT Filed: Jul. 25, 2023

(86) PCT No.: PCT/CA2023/050987
§ 371 (c)(1),
(2) Date: Feb. 26, 2025

(87) PCT Pub. No.: WO2024/020673
PCT Pub. Date: Feb. 1, 2024

(65) Prior Publication Data

US 2026/0003444 A1 Jan. 1, 2026

Related U.S. Application Data

(60) Provisional application No. 63/392,972, filed on Jul. 28, 2022.

(51) Int. Cl.
*G06F 3/0346* (2013.01)
*G06F 3/01* (2006.01)
*G06F 3/038* (2013.01)

(52) U.S. Cl.
CPC ............ *G06F 3/0346* (2013.01); *G06F 3/016* (2013.01); *G06F 3/038* (2013.01); *G06F 2203/015* (2013.01)

(58) Field of Classification Search
CPC ............................... G06F 3/016; G06F 3/0346
See application file for complete search history.

(56) References Cited

U.S. PATENT DOCUMENTS 6,252,579 B1 6/2001 Rosenberg et al.
9,895,812 B2 2/2018 Gonzalez
(Continued)

OTHER PUBLICATIONS

International Searching Authority—Candadian Intellectual Property Office; International Search Report filed in corresponding International Application No. PCT/CA2023/050987, dated Oct. 17, 2023; 3 pages.

(Continued)

*Primary Examiner* — Kevin M Nguyen
(74) *Attorney, Agent, or Firm* — Black McCuskey

(57) ABSTRACT

Described are various embodiments of an input device for 2D pointing and 3D force feedback. In one embodiment, the input device comprises a casing, a 2D position tracking system to track a 2D position of the input device relative to a surface; a control system housed in the casing coupled to said 2D positional tracking system configured to communicate said 2D position to a computer; and an attachment component coupled to said input device and configured to releasably mechanically couple the input device to a grounded force feedback device to receive haptic force feedback therefrom. In some embodiments, the attachment component comprises an elongated member projecting outwardly from the input device and has a coupling portion at the distal end thereof for releasably coupling with the grounded haptic force feedback device. The input device comprises an orientation sensor to track an orientation while coupled to the grounded force feedback device.

3 Claims, 7 Drawing Sheets

(56) References Cited

U.S. PATENT DOCUMENTS

| | | | | |
|---|---|---|---|---|
| 2010/0261526 | A1* | 10/2010 | Anderson | G06F 3/016<br>345/157 |
| 2018/0345137 | A1* | 12/2018 | Schmitz | A63F 13/285 |
| 2020/0192486 | A1* | 6/2020 | Schoessler | G06F 3/041 |

OTHER PUBLICATIONS

International Searching Authority—Candadian Intellectual Property Office; Written Opinion filed in corresponding International Application No. PCT/CA2023/050987, dated Sep. 7, 2023; 6 pages.

* cited by examiner

INPUT DEVICE FOR 2D POINTING AND 3D FORCE FEEDBACK

CROSS-REFERENCE TO RELATED APPLICATIONS

This application claims the benefit of U.S. Provisional Application No. 63/392,972 filed Jul. 28, 2022, which is incorporated herein by reference in its entirety.

FIELD OF THE DISCLOSURE

The present disclosure relates to input devices, and, in particular, to an input device for 2D pointing and 3D force feedback.

BACKGROUND

With the current advances in Virtual and Mixed Reality technologies, more methods of 3D interactions are being developed. Nevertheless, 2D interactions are the most intuitive in many cases. Such interactions can be for instance drawings, writing.

Examples of real 3D interaction in the air are known to be the source of fatigue for the users as it can be painful to keep waving arms in the air for long periods of time. One solution could be to use a force feedback system to restrict the motions in a 2D planes, unfortunately this comes with side effects like instability or lack of rigidity in the case of active force feedback devices. For passive (e.g., brakes) force feedback devices it can create issues of a sensation of sticking to the surface. Neither approach provides the quality of interaction we could hope for.

This background information is provided to reveal information believed by the applicant to be of possible relevance. No admission is necessarily intended, nor should be construed, that any of the preceding information constitutes prior art or forms part of the general common knowledge in the relevant art.

SUMMARY

The following presents a simplified summary of the general inventive concept(s) described herein to provide a basic understanding of some aspects of the disclosure. This summary is not an extensive overview of the disclosure. It is not intended to restrict key or critical elements of embodiments of the disclosure or to delineate their scope beyond that which is explicitly or implicitly described by the following description and claims.

A need exists for an input device that allows to seamlessly switch between a two-dimension (2D) scenario wherein the input device is moved in 2D along a surface, and a 3D interaction paradigm where the input device can be moved in three-dimensions (3D) while receiving force feedback. In some embodiments, this includes the use of a quick connect or attachment system allowing the input device to be releasably attached to a grounded force feedback device, thereby allowing the input device to receive haptic force feedback while being manipulated in 3D space. Upon the input device being disconnected from the force feedback device, it can readily be used as a conventional computer mouse or the like.

In accordance with one aspect, there is provided an input device, comprising: a casing; a 2D position tracking system housed in said casing and operable to track a 2D position of the input device relative to a surface; a control system housed in the casing coupled to said 2D positional tracking system configured to communicate said 2D position to a computing device; an attachment component coupled to said input device and configured to releasably mechanically couple the input device to a grounded force feedback device to receive haptic force feedback therefrom.

In one embodiment, the attachment component comprises an elongated member projecting outwardly from the input device and having a coupling portion at the distal end thereof for releasably coupling with the grounded haptic force feedback device.

In one embodiment, the attachment component translationally rigidly couples the input device to the force feedback device while allowing free rotational motion of the input device.

In one embodiment, the coupling portion is a substantially spherical end portion configured to be received in a corresponding socket of the grounded force feedback device.

In one embodiment, the input device further comprises: an orientation sensor housed in said casing and coupled to said control system, the orientation sensor operable to track an orientation in 3D space of the input device, and wherein said control system is further configured to communicate said orientation to said computing device.

In one embodiment, the orientation sensor is further configured to track a three-dimensional position of said input device in addition to the orientation and communicate both the three-dimensional position and orientation to said computing device.

In one embodiment, the orientation sensor is an inertial measurement unit (IMU).

In one embodiment, the control system is configured to detect whether said attachment component is coupled to the force feedback device.

In one embodiment, the detection is done by receiving a signal from an input element of said input device by a user.

In one embodiment, the control system is further configured to turn on said orientation sensor and communicate said orientation only upon the attachment component being coupled to the grounded force feedback device.

In accordance with another aspect, there is provided a method for providing input to a computing device, the method comprising the steps of: detecting, by a processor, whether an input device is mechanically coupled to a grounded force feedback device; upon said processor detecting that the input device is not coupled to the grounded force feedback device, tracking, by the processor via a two-dimension (2D) position tracking system, a 2D position of said input device along a surface; upon said processor detecting that the input device is coupled to the force feedback device, tracking by the processor an orientation and a position of said input device in three-dimensional (3D) space.

In one embodiment, the orientation is communicated by an orientation sensor of the input device.

In one embodiment, the position in 3D space is communicated to the processor by the input device.

In one embodiment, the 3D position is communicated to the processor by the force feedback device.

In one embodiment, upon said processor detecting that the input device is coupled to the force feedback device, further communicating said 3D position and orientation to the grounded force feedback device.

In one embodiment, the detecting is done by: receiving a signal that the input device is coupled or not coupled to the grounded force feedback device.

In one embodiment, the signal is sent by the input device to the processor upon a user interacting with an input element of said input device.

In one embodiment, the input device comprises an attachment component for releasably mechanically coupling the input device to the grounded force feedback device.

In one embodiment, the attachment component comprises an elongated member projecting outwardly from the input device and having a coupling portion at the distal end thereof for releasably coupling with the grounded haptic force feedback device.

In one embodiment, the input device is configured to automatically detect the attachment component being coupled to the grounded force feedback device and communicate said detection to the processor.

Other aspects, features and/or advantages will become more apparent upon reading of the following non-restrictive description of specific embodiments thereof, given by way of example only with reference to the accompanying drawings.

BRIEF DESCRIPTION OF THE DRAWINGS

Several embodiments of the present disclosure will be provided, by way of examples only, with reference to the appended drawings, wherein.

Figures 1A, 1B:
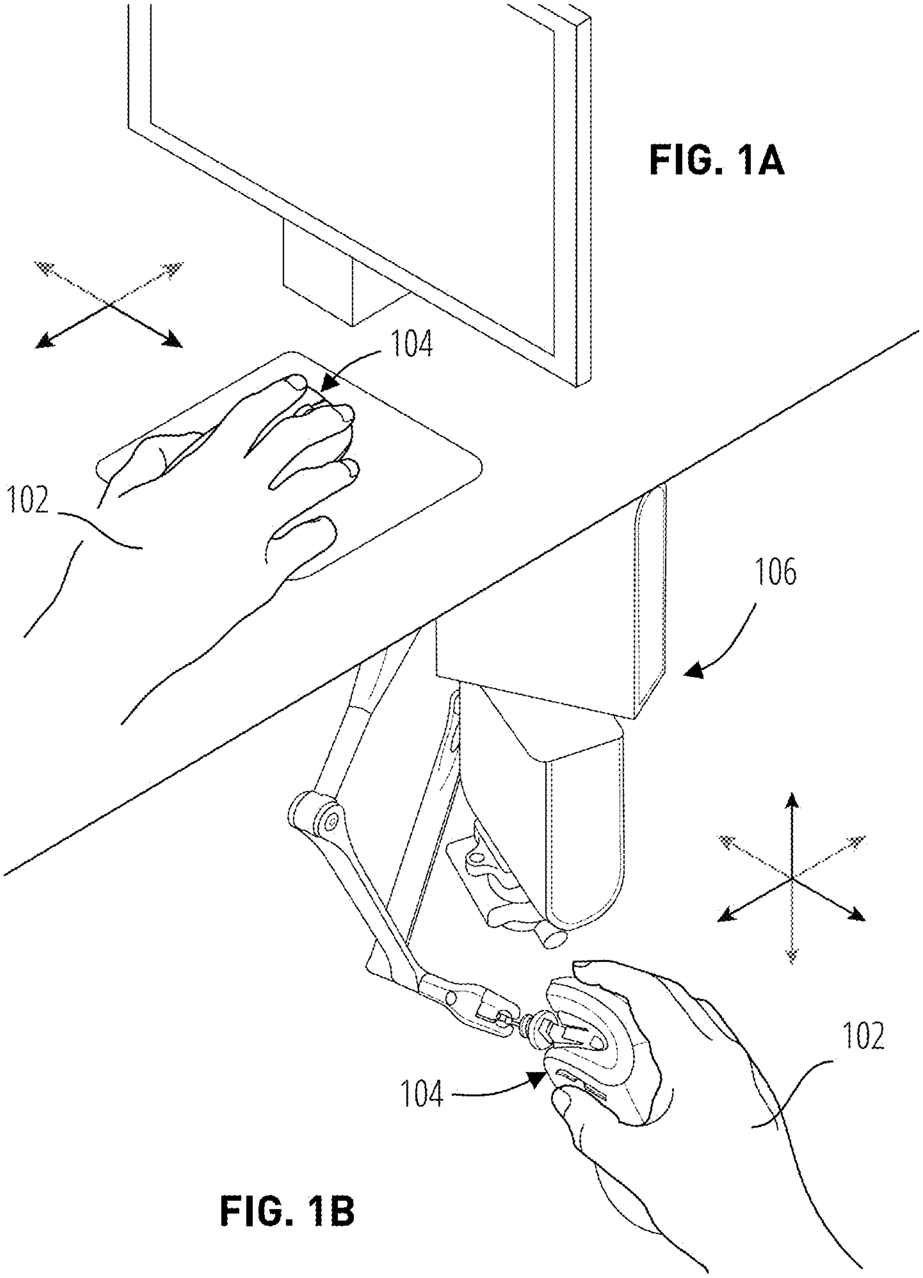
FIG. 1A and FIG. 1B are perspective views illustrating an exemplary input device being used in a 2D mode of operation (FIG. 1A) and in a 3D mode of operation (FIG. 1B), in accordance with one embodiment.

Elements in the several drawings are illustrated for simplicity and clarity and have not necessarily been drawn to scale. For example, the dimensions of some of the elements in the figures may be emphasized relative to other elements for facilitating understanding of the various presently disclosed embodiments. Also, common, but well-understood elements that are useful or necessary in commercially feasible embodiments are often not depicted in order to facilitate a less obstructed view of these various embodiments of the present disclosure.

DETAILED DESCRIPTION

Various implementations and aspects of the specification will be described with reference to details discussed below. The following description and drawings are illustrative of the specification and are not to be construed as limiting the specification. Numerous specific details are described to provide a thorough understanding of various implementations of the present specification. However, in certain instances, well-known or conventional details are not described in order to provide a concise discussion of implementations of the present specification.

Furthermore, numerous specific details are set forth in order to provide a thorough understanding of the implementations described herein. However, it will be understood by those skilled in the relevant arts that the implementations described herein may be practiced without these specific details. In other instances, well-known methods, procedures and components have not been described in detail so as not to obscure the implementations described herein.

In this specification, elements may be described as "configured to" perform one or more functions or "configured for" such functions. In general, an element that is configured to perform or configured for performing a function is enabled to perform the function, or is suitable for performing the function, or is adapted to perform the function, or is operable to perform the function, or is otherwise capable of performing the function.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

The present disclosure provides, in accordance with different embodiments, different examples of an input device and method for 2D pointing and 3D force feedback. In some embodiments, the device provides means to switch between two interaction paradigms or modes of operation, for both the classic world (2D visuals) and the 3D world (3D visuals), such that the device may be used as a standard input for many applications as well as for the use of computer systems, such as virtual reality (VR) applications, for example.

In some embodiments, 3D interaction may be enabled by using the mechanical design of a quick connect system or attachment component allowing the device to be removably coupled or attached to and used with a grounded force feedback device. In order to allow for more interactions, in some embodiments, the input device may include an orientation sensor such as an inertial measurement unit (IMU) or the like to sense the orientation in 6 degrees of freedom interactions.

In some embodiments, in order to provide this dual interaction, a quick way of connecting and disconnecting the input device is provided in the form of an attachment component. In some embodiments, this connector or tool provides a quick rigid link to translate the device in the 3-directions of 3D space with the haptic force feedback device while allowing free rotations of the input device. In some embodiments, a seamless transition may be enabled by having a quick, split second solution to attach and detach the device. This may include both a mechanical connection and control schemes to make it usable. The control scheme may be configured to transition from using the 2D tracking system of the input device to using the 3D position from the haptic force feedback device (e.g., robotic arm or the like) and/or a 3D orientation. The goal of the transition is to be ubiquitous and require the less amount of thinking for the user.

In some embodiments, the input device may include therein a 3D tracking system coupled to the control system and can be used for 3D interactions without being tethered or connected to the haptic force feedback device (e.g., robotic arm or the like). This would provide a larger workspace when doing 3D interactions, and by attaching to the robotic arm or portion of the haptic force feedback device in one subpart of the 3D space the user would be able to feel forces and resistance when interacting with virtual elements.

In some embodiments, the 3D tracking solution can either/or track orientation and translation in 3D space.

In accordance with one embodiment, the two interactions schemes or modes of operation are illustrated in FIG. 1A and FIG. 1B. In the first case (1A), a user 102 is using the input device 104 like a regular mouse, and the movements are in two dimensions. In the second interaction scheme or mode of operation (1B), the same input device 104 is attached to a 3D grounded force feedback device 106, and it can be moved in 3 directions.

Figure 2:
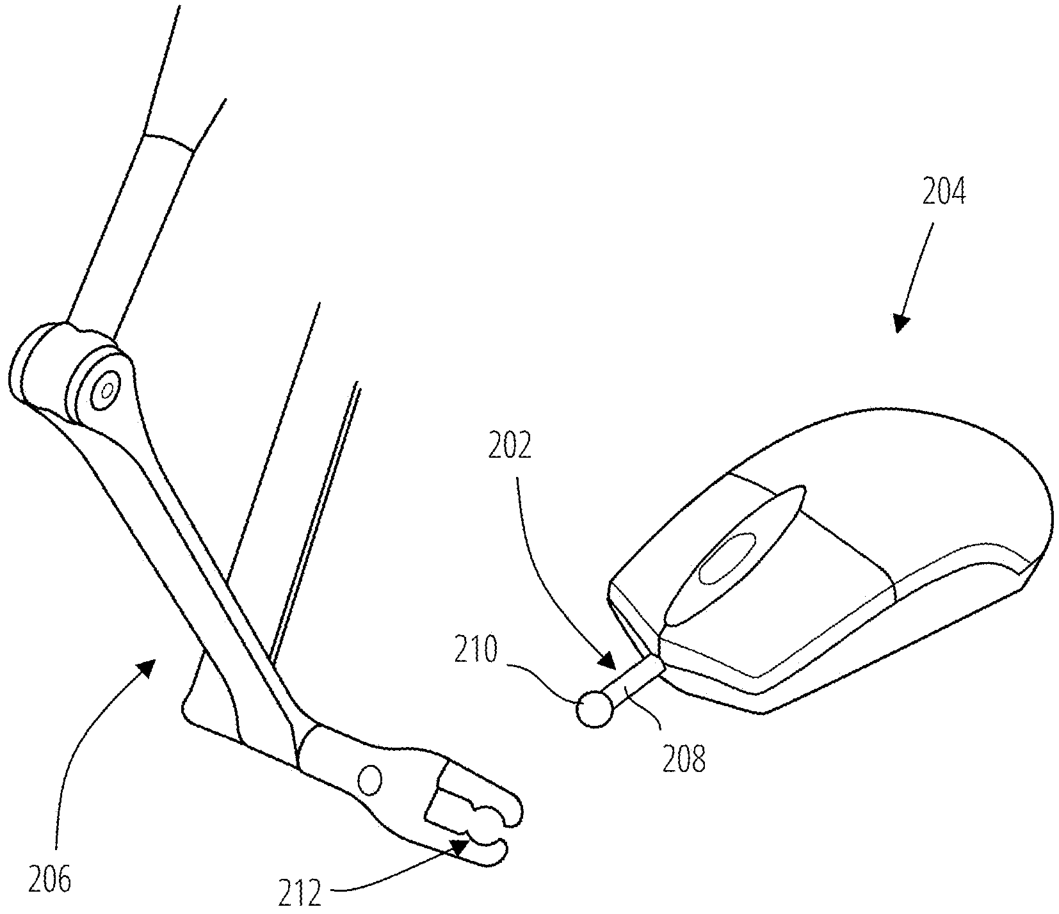
FIG. 2 is a perspective view illustrating an exemplary input device and an exemplary socket configured to receive an attachment component of the input device, in accordance with another embodiment.

FIG. 2 shows, in accordance with one embodiment, an attachment component 202 needed to attach an input device 204 to a 3D force feedback system 206 is illustrated. In this example, in the input device 204 the attachment component 202 comprises an elongated member or extension 208 with a ball 210 at one end that can enter a socket 212 in the force feedback device 206. The socket 212 locks the input device 204 in place and allows for 3D interaction with force feedback.

Figure 3:
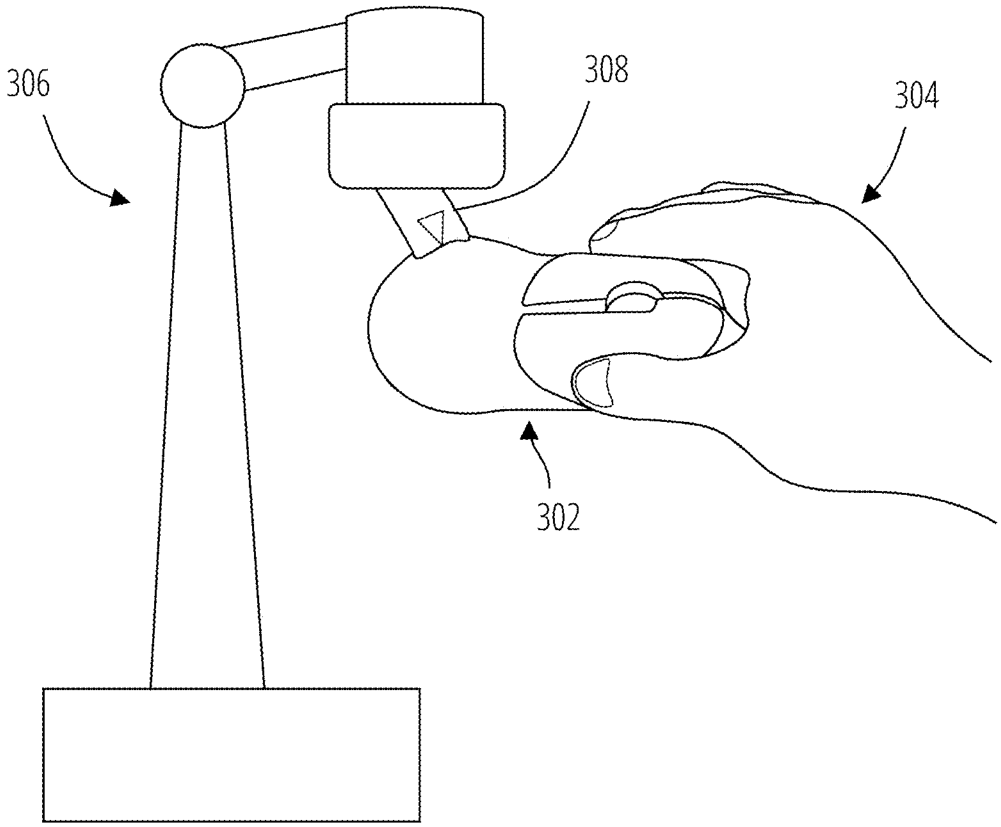
FIG. 3 is a perspective view illustrating another exemplary input device coupled to a robotic arm, in accordance with one embodiment.

FIG. 3 shows another embodiment of an input device 302 while being used for 3D interactions. The user 304 is gripping on the input device 302, while the device 302 is attached to the robotic arm 306 (via an attachment component 308 on the input device 302). The robotic arm 306 allows the user 304 to feel forces when interacting in 3 dimensions.

Figure 4A:
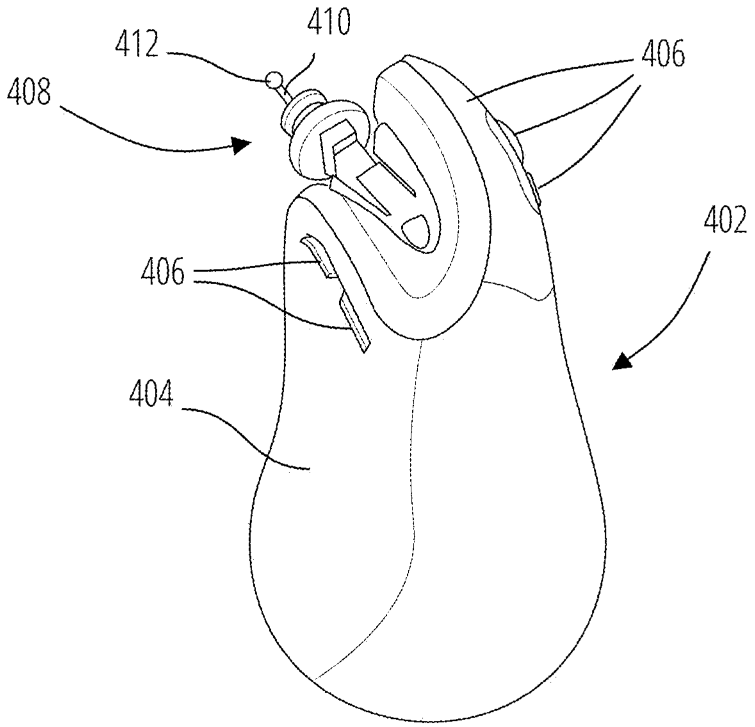
FIG. 4A, FIG. 4B and FIG. 4C are perspective views of an input device alone (FIG. 4A) and attached to a grounded force feedback device (FIG. 4B and FIG. 4C), in accordance with one embodiment.
Figure 4B:
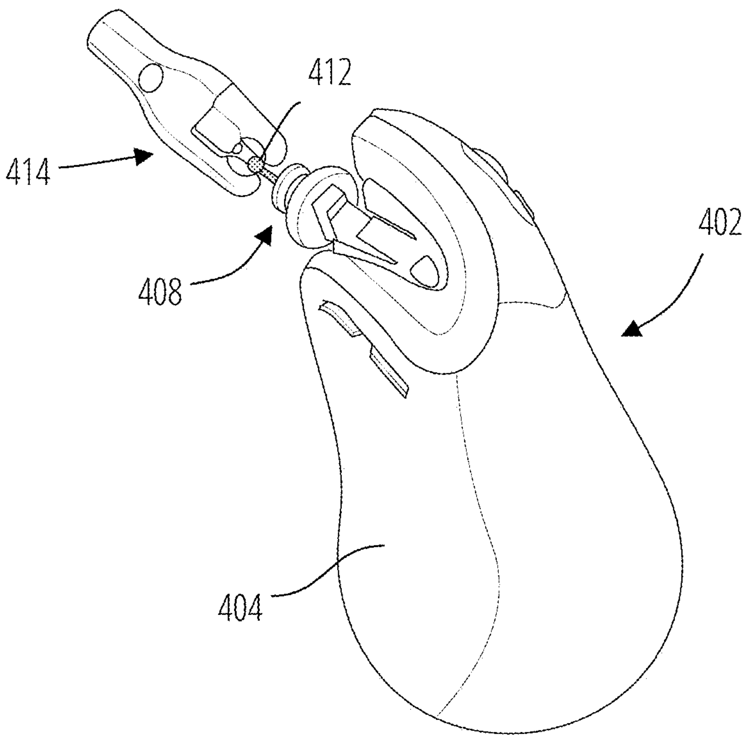
Figure 4C:
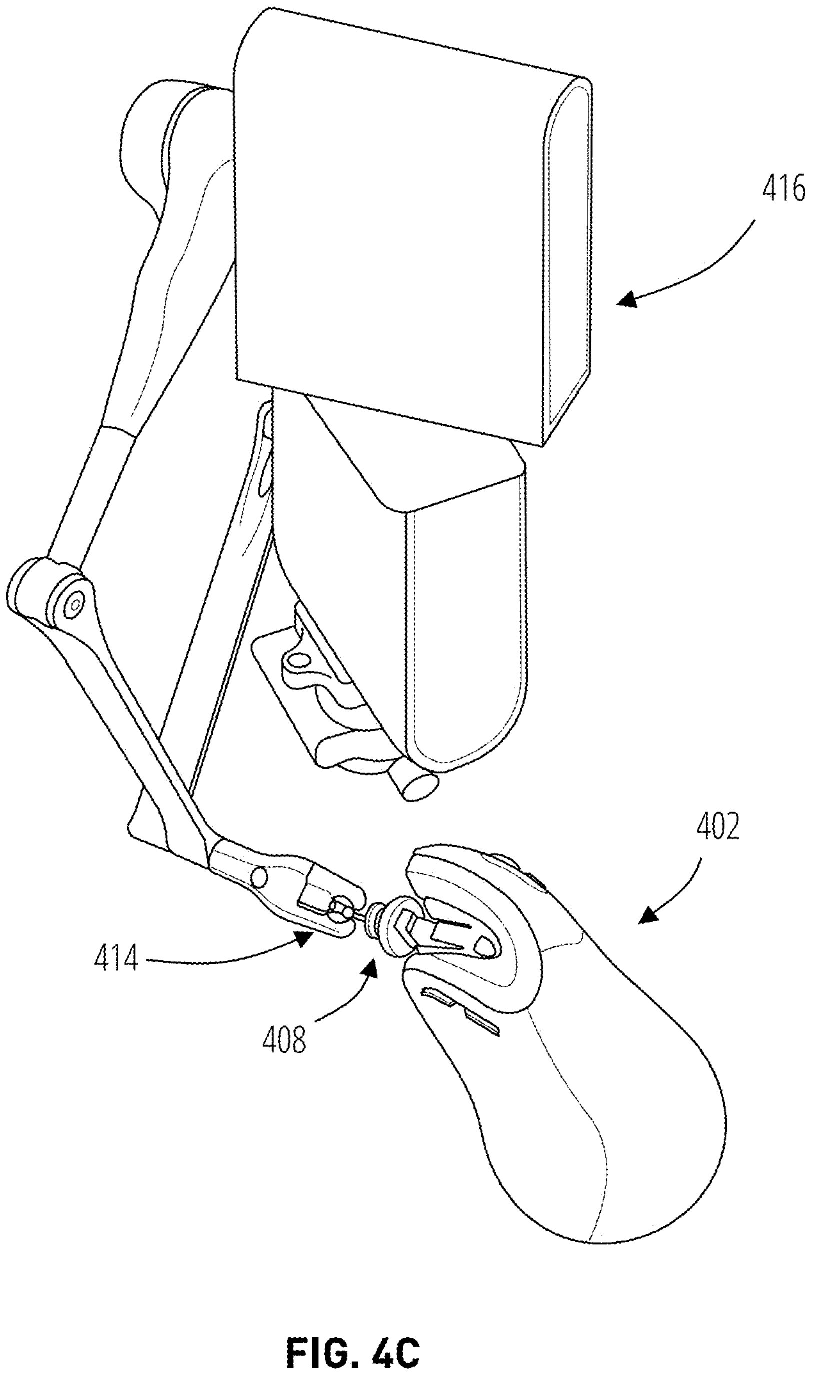

With reference to FIGS. 4A, 4B and 4C, and in accordance with another exemplary embodiment, an input device 402 will be discussed. The input device 402 comprises a housing or casing 404, the top and side portions of the casing generally being rounded and shaped to be easily and comfortably held and moved on a flat surface by a user's hand. One or more input elements (e.g., main buttons and/or trigger buttons) 406 may also be present. The illustrated shape, size and position of the buttons and triggers is not meant to be limitative and other configurations may equally be considered without limitation. For example, the input device 402 is shown for right-handed use with the (main buttons on the right side), however a left-handed design may also equally be considered where the location of the different elements is reversed from the one illustrated.

The casing 404 of the input device 402 further typically houses a two-dimensional positional tracking system (not shown) connected to a control system also housed within the casing 404. Different hardware configures for the two-dimensional positional tracking system may be considered, for example an optical tracking system and/or mechanical tracking systems using a roller ball or the like, which allows to track a position in two-dimension with respect to a surface the input device 402 is moved thereon. Typically the two-dimensional tracking system would be located on the bottom portion of the casing 402, as is well known in the art, and will not be discussed here. Thus, in a first configuration, the input device 402 may readily be used as a typical computer mouse or the like to provide a two-dimensional position or location to perform a plurality of inputs for computer-related tasks (e.g., interacting with a 2D graphical user interface, etc.).

In this example, the input device 402 comprises an attachment component 408 extending outwardly from the device (here illustrated on the front left side of the input device 402 as an example only). The mechanical attachment component 408 comprises an elongated member 410 and is configured to be releasably attachable at spherical end thereof 412 to a receiving connecting portion 414 of a haptic force feedback device 416. In this embodiment, and as an example only, the attachment component 408, the receiving connection portion 414 and the haptic force feedback device 416 are those described in International Patent Application No. PCT/IB2021/000644, which is incorporated herein by reference in its entirety. However, the skilled person in the art will appreciate that other mechanical quick-release coupling mechanisms may be considered as well, without limitation. Typically, any quick-release mechanism known in the art which allows translationally rigidly couple the input device to an arm or part of the force feedback device while allowing free rotational motion of the input device may be considered. In addition, it will be understood that the input device 402 may be used with different grounded force feedback devices than the device 416 illustrated in FIG. 4C.

Figure 5:
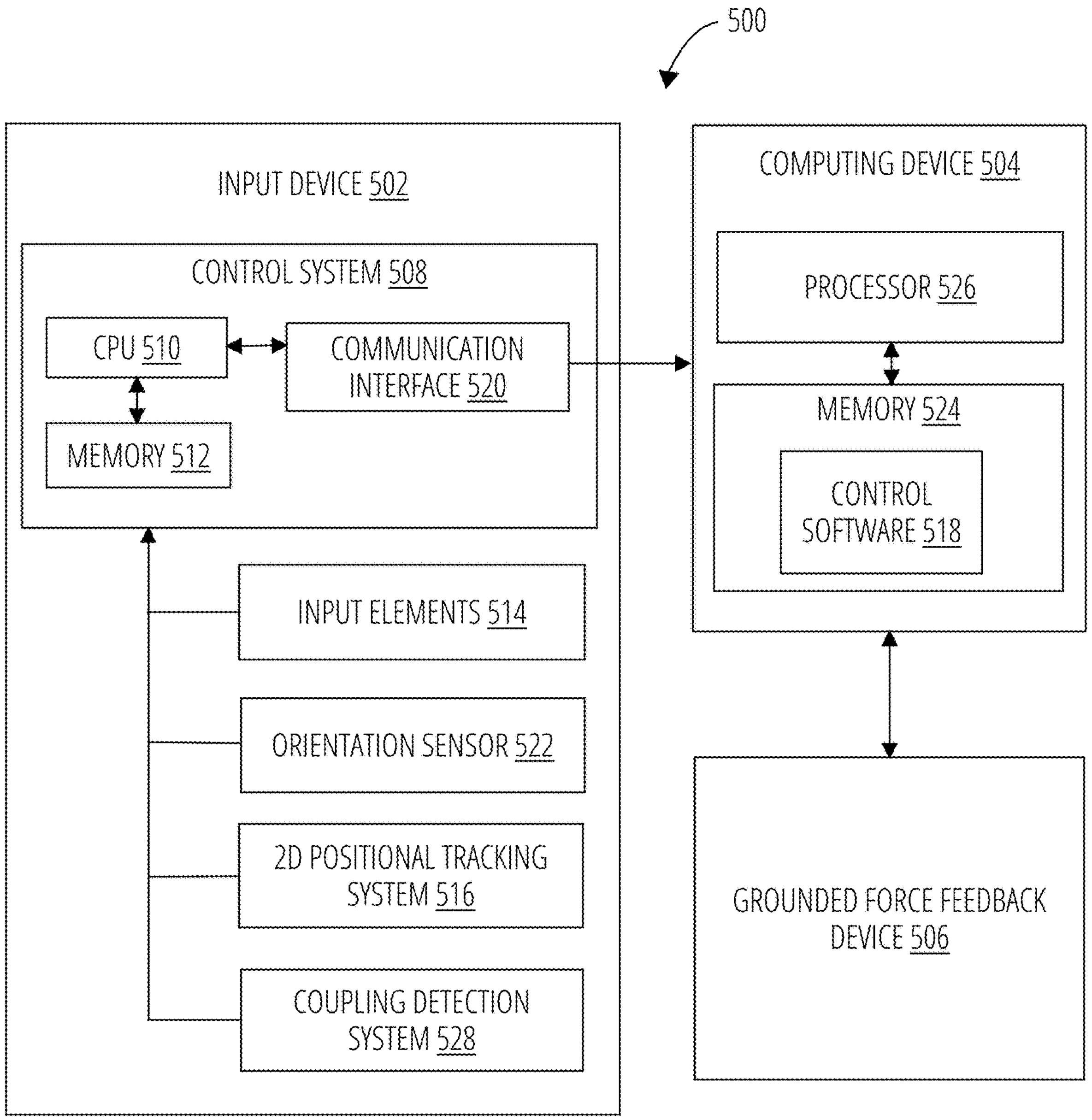
FIG. 5 is schematic diagram illustrating a system comprising the input device of FIGS. 1A and 1B, a computing system and a grounded force feedback device, in accordance with one embodiment.

FIG. 5 illustrates, in accordance with another embodiment, a schematic diagram of system 500 comprising an input device 502, a computing device 504 and a grounded force feedback device 506. The input device 502 comprises therein a control system 508. The control system 508 may include one or more digital processors (e.g., CPU 510) and a memory 512 communicatively coupled to one or more actionable input elements 514, such as triggers, buttons, wheels or sliders located on different locations of the outer portion of the casing of the input device 502. The control system 508 is further communicatively coupled to a 2D positional tracking system 516 configured to track a position of the input device 502 along a surface. As discussed above, the 2D positional tracking system 516 may include any kind of 2D tracking system known in the art, including for example an optical and/or mechanical tracking system. Upon the input device 502 being used in a 2D mode (e.g., as a conventional mouse in some embodiments), the control system 508 is configured to communicate any input from the input elements 514 and the 2D position to the control software 518 of another device, such as the computing device 504 via a communication interface 520. In some embodiments, the communication interface 520 may comprise means to communicate wirelessly via protocols such as Bluetooth, near field communications, Wi-Fi, and/or any other wireless communications protocol or technology capable of being understood by anyone skilled in the art, to communicate with the computing device 504. However, while less practical, in some embodiments, the communication interface 520 may be configured to communicate with the computing device 504 over a wired connection. It will be understood that the computing device 504 may take multiple forms, including for example a laptop, desktop, dedicated gaming device, VR/AR device, smartphone, tablet or the like. The computing device 504 is itself communicatively coupled to a grounded force feedback device 506, or in some embodiments the computing device 504 and the grounded force feedback device 506 may be integrated into a same device.

The input device 502 further comprises an orientation sensor 522 configured to track an orientation or change in orientation of the input device 502 in three-dimensional space upon being used in a 3D mode (e.g., upon being releasably mechanically coupled to a grounded force feedback device 506). In some embodiments, the orientation sensor 522 may further be configured to track a three-dimensional position of the input device 502. In some embodiments, the orientation sensor 522 may take the form of an inertial measurement unit (IMU) or the like configured to provide 6-degrees of freedom information. Thus, when used in the 3D mode, the input device 502 is configured to provide the inputs from the input elements 514 and the orientation to the control software 518 of the computing device 504. In some instances, a 3D position of the input device 502 tracked by the orientation sensor 522 may be communicated as well. Other embodiments may have the 3D position obtained by the control software 518 by other means, for example by one or more tracking cameras (not shown) coupled to the computing device 504, or in other cases obtained by the grounded force feedback device 506 itself (e.g., by tracking a position of an arm or member on which the input device 502 is attached).

The control software 518 located in the memory 524 of the computing device 504 may take the form of a driver software or the like comprising instructions that when executed by the processor 526 of the computing device 504, allow the computing device 504 to interface or communicate with the control system 508 and receive data therefrom. In some embodiments, the control software 518 may further include instructions to provide the orientation, the 3D position and/or inputs received from the input device 502 to the grounded force feedback device 506 so that the grounded force feedback device 506 may provide a designated haptic force feedback thereto. The skilled person in the art will understand that in some embodiments the computing device 504 and grounded force feedback device 506 may be combined into a same device. In addition, in some embodiments, the control software 518 may include instructions to control and operate the grounded force feedback device 506.

In some embodiments, the input device 502 may further comprise a coupling detection system 528 configured to track or detect whether the input device 502 has been mechanically coupled to or uncoupled from the grounded force feedback device 506. In some embodiments, the coupling detection system 528 may include a wireless transmitter in the attachment component operable to communicate with a receiver in the grounded force feedback device 506, for example located near the socket or attachment location. In some embodiments, this coupling information may be communicated to the computing device 504 directly, while in other embodiments the information may be received by the control software 518 by the grounded force feedback device 506 instead. In some embodiments, the indication that the input device 502 is coupled or not to the grounded force feedback device 506 may be provided by other means. For example, in some embodiments, one or more of the input elements 514 on the input device 502 may be configured to provide a signal that the input device 502 is to be used in the 2D mode or the 3D mode. The exact sequence of buttons, triggers or other input elements is not important and can be configured as required. In some embodiments, a dedicated button or trigger may be provided.

Figure 6:
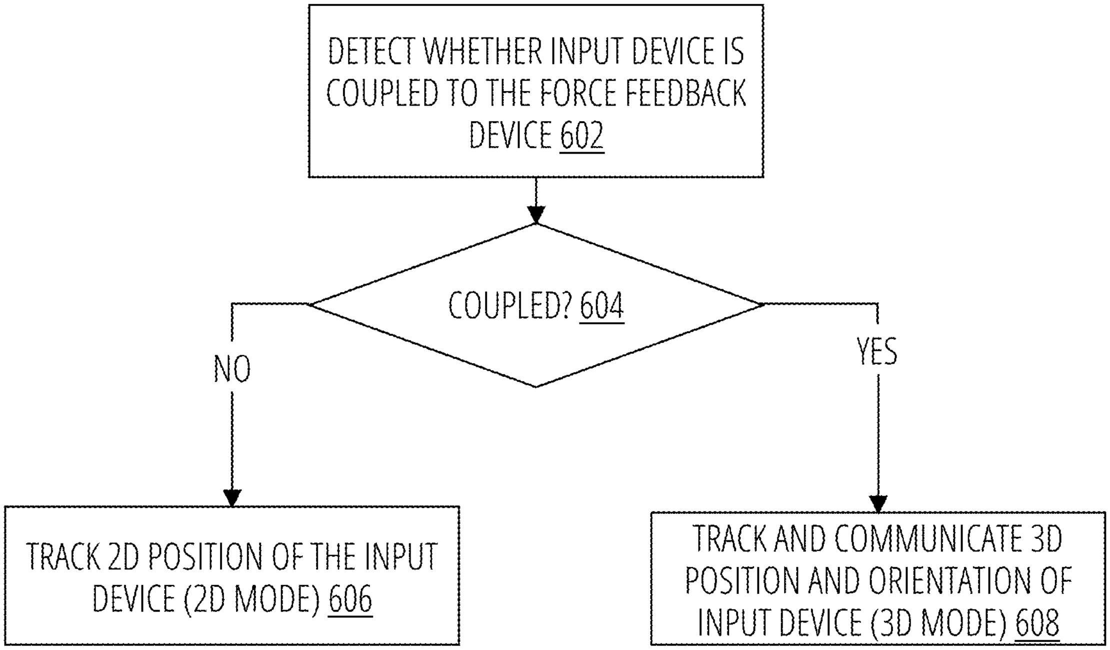
FIG. 6 is a flow diagram illustrating a method of providing input using the input device of FIGS. 1A and 1B, in accordance with one embodiment.

FIG. 6 is an exemplary block diagram illustrating an input method, in accordance with one embodiment. At block 602, a processor detects whether the input device is releasably mechanically coupled to the grounded force feedback device. As discussed above, this may be done automatically via the use of a coupling detection system or the like, or by receiving a signal triggered by the user from the input device itself or from another device (e.g., the computing device 504). If the processor determines that the input device is not coupled to the grounded force feedback device 506 (block 604), then the processor tracks (at step 606) a 2D position of the input device along a surface, for example for interacting with a 2D graphical user interface or the like. However, if the processor detects that the input device is coupled to the grounded force feedback device, then at step 608 it tracks and communicates a 3D orientation (and optionally a 3D position) of the input device for interacting with three-dimensional user interfaces-such as those used in VR or 3D simulations. This information is further transmitted or communicated to the grounded force feedback device directly or indirectly so that haptic force feedback is generated by the force feedback device while the user moves the input device in three-dimensional space.

The functionality described herein can be performed, at least in part, by one or more hardware logic components. According to an embodiment, the computing apparatus is configured by the program code when executed by the processor(s) to execute the embodiments of the operations and functionality described. Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Program-specific Standard Products (ASSPs), System-on-a-chip systems (SOCs), Complex Programmable Logic Devices (CPLDs), Graphics Processing Units (GPUs).

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein.

By way of example, and not limitation, computer-readable media or memory can comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, or other magnetic storage devices, or any other medium which can be used to store the desired information and which can be accessed by the computer.

While the present disclosure describes various embodiments for illustrative purposes, such description is not intended to be limited to such embodiments. On the contrary, the applicant's teachings described and illustrated herein encompass various alternatives, modifications, and equivalents, without departing from the embodiments, the general scope of which is defined in the appended claims. Information as herein shown and described in detail is fully capable of attaining the above-described object of the present disclosure, the presently preferred embodiment of the present disclosure, and is, thus, representative of the subject matter which is broadly contemplated by the present disclosure.

What is claimed is:

1. A computer mouse comprising:

a casing;

a two-dimensional (2D) position tracking system housed in said casing and operable to track a 2D position of said computer mouse relative to a surface;

a control system housed in the casing coupled to said 2D positional tracking system configured to communicate said 2D position to a computing device;

an attachment component coupled to said computer mouse and configured to releasably mechanically couple said computer mouse to a grounded force feedback device to receive haptic force feedback therefrom;

a wireless coupling detection system configured to detect whether said attachment component is coupled to the grounded force feedback device;

an orientation sensor housed in said casing and coupled to said control system, the orientation sensor operable to track an orientation in 3D space of said computer mouse, and wherein said control system is further configured to communicate said orientation to said computing device;

wherein said orientation sensor is further configured to track a three-dimensional position of said computer mouse in addition to the orientation and communicate both the three-dimensional position and orientation to said computing device;

upon said wireless coupling detection system detecting that said computer mouse is not coupled to the grounded force feedback device, tracking, by the 2D position tracking system, the 2D position of said computer mouse along a surface;

only upon said wireless coupling detection system detecting that said computer mouse is coupled to the grounded force feedback device, the control system turning on the orientation sensor and communicating the orientation of said computer mouse in three-dimensional (3D) space; and wherein said orientation sensor is an inertial measurement unit (IMU).

2. A computer mouse comprising:

a casing;

a 2D position tracking system housed in said casing and operable to track a 2D position of said computer mouse relative to a surface;

a control system housed in the casing coupled to said 2D positional tracking system configured to communicate said 2D position to a computing device;

an attachment component coupled to said computer mouse and configured to releasably mechanically couple said computer mouse to a grounded force feedback device to receive haptic force feedback therefrom;

an orientation sensor housed in said casing and coupled to said control system, the orientation sensor operable to track an orientation in 3D space of said computer mouse, and wherein said control system is further configured to communicate said orientation to said computing device;

a wireless coupling detection system configured to detect whether said attachment component is coupled to the grounded force feedback device; and wherein said control system is further configured to turn on said orientation sensor and communicate said orientation only upon said wireless coupling detection system detecting the attachment component being coupled to the grounded force feedback device.

3. A method for providing input to a computing device, the method comprising the steps of:

detecting, by a wireless coupling detection system of a computer mouse, whether said computer mouse is mechanically coupled to a grounded force feedback device;

housing an orientation sensor in a casing and coupled to a control system, the orientation sensor operable to track an orientation in three-dimension (3D) space of said computer mouse, and wherein the control system is further configured to communicate the orientation to the computing device;

upon said wireless coupling detection system detecting that said computer mouse is not coupled to the grounded force feedback device, tracking, by the processor via a two-dimension (2D) position tracking system, a 2D position of said computer mouse along a surface; and only upon said wireless coupling detection system detecting that said computer mouse is coupled to the grounded force feedback device, turning on the orientation sensor to sense an orientation and a position of said computer mouse in three-dimensional (3D) space and communicate the orientation.

* * * * *